(12) United States Patent
Liaw et al.

(10) Patent No.: US 6,363,369 B1
(45) Date of Patent: Mar. 26, 2002

(54) DYNAMIC SYNAPSE FOR SIGNAL PROCESSING IN NEURAL NETWORKS

(75) Inventors: Jim-Shih Liaw; Theodore W. Berger, both of Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 09/096,678

(22) Filed: Jun. 11, 1998

Related U.S. Application Data

(60) Provisional application No. 60/049,754, filed on Jun. 11, 1997.

(51) Int. Cl.[7] ................................................. G06N 3/04

(52) U.S. Cl. .............................. 706/15; 706/26; 706/16

(58) Field of Search .................................... 706/15, 26

(56) References Cited

U.S. PATENT DOCUMENTS

| | | |
|---|---|---|
| 4,896,053 A | 1/1990 | Kesselring |
| 5,214,745 A | 5/1993 | Sutherland |
| 5,220,642 A | 6/1993 | Takahashi |
| 5,222,195 A | 6/1993 | Alkon |
| 5,355,435 A * | 10/1994 | DeYoung et al. ............. 706/26 |
| 5,386,497 A | 1/1995 | Torrey |
| 5,402,522 A | 3/1995 | Alkon |
| 5,553,195 A | 9/1996 | Meijer |
| 5,588,091 A | 12/1996 | Alkon |

OTHER PUBLICATIONS

Chay, T.R., Complex oscillations and chaos in a simple neuron model, Neural Networks, 1991., IJCNN–91–Seattle International Joint Conference on, vol.: ii, 1991, pp: 657–662 vol. 2, Jan. 1991.*

Crair, M.C.; Bialek, W., Non–Boltzmann dynamics in networks of spiking neurons, Neural Networks, 1991. 1991 IEEE International Joint Conference on , 1991 , pp: 2508–2514 vol. 3, Jan. 1991.*

Lazzaro, J., Low–power silicon spiking neurons and axons, Circuits and Systems, 1992. ISCAS '92. Proceedings., 1992 IEEE International Symposium on, vol.: 5 , 1992 , pp: 2220–2223 vol. 5, Nov. 1998.*

Maass, Wolfgang et al., Pulsed Neural Networks, The MIT Press, Nov. 30, 1998.*

Brettle, D.; Niebur, E., Detailed parallel simulation of a biological neuronal network, IEEE Computational Science and Engineering, vol.: 1 4 , Winter 1994 , pp: 31–43, Jan. 1994.*

(List continued on next page.)

Primary Examiner—Mark R. Powell
Assistant Examiner—Wilbert L. Starks, Jr.
(74) Attorney, Agent, or Firm—Fish & Richardson P.C.

(57) ABSTRACT

An information processing system having signal processors that are interconnected by processing junctions that simulate and extend biological neural networks. Each processing junction receives signals from one signal processor and generates a new signal to another signal processor. The response of each processing junction is determined by internal junction processes and is continuously changed with temporal variation in the received signal. Different processing junctions connected to receive a common signal from a signal processor respond differently to produce different signals to downstream signal processors. This transforms a temporal pattern of a signal train of spikes into a spatiotemporal pattern of junction events and provides an exponential computational power to signal processors. Each signal processing junction can receive a feedback signal from a downstream signal processor so that an internal junction process can be adjusted to learn certain characteristics embedded in received signals.

30 Claims, 12 Drawing Sheets

OTHER PUBLICATIONS

Gerstner, W., Rapid signal transmission by populations of spiking neurons, Artificial Neural Networks 1999. ICANN 99. Ninth International Conference on (Conf. Publ. No. 470) vol.: 1 , 1999 , pp: 7–12, Jan. 1999.*

Lotz, K.; Vidnyanszky, Z.; Roskar, T.; Vandewalle, J.; Hamori, J.; Jacobs, A.; Werblin, F., Some cortical spiking neuron models using CNN Cellular Neural Networks and their Applications, 1994. CNNA–94., Proceedings of the Third IEEE International Workshop, Jan. 1994.*

"Novel Heterostructure Device for Electronic Pulse–Mode Neural Circuits," C. Song and K.P. Roenker; IEEE Transactions on Neural Networks, vol. 5, No. 4, Jul. 1994.

Theodore W. Berger, "A Hybrid Neuron–Silicon Computational System for Pattern Recognition", Sep. 1999, DARPA Controlled Biological Systems Program Quarterly Report, pp. 1–6.

Jim–Shih Liaw and Theodore W. Berger, "Dynamic synapse: Harnessing the computing power of synaptic dynamics", Jul. 1999, Neurocomputing, pp. 199–206.

Jim–Shih Liaw and Theodore W. Berger, "Robust Speech Recognition With Dynamic Synapses", May 1998, Proceedings of the IJCNN '98, Anchorage, Alaska, pp. 2175–2179.

Jim–Shih Liaw and Theodore W. Berger, "Computing with Dynamic Synapses: A Case Study of Speech Recognition", Jun. 1997, The 1997 IEEE International Conference on Neural Networks, Houston, Texas, USA, pp. 350–355.

* cited by examiner

|         | N1 | N2 | N3 | N4 |
|---------|----|----|----|----|
| "HIT"   | 20 | 20 | 20 | 20 |
| "HEIGHT"| 37 | 37 | 37 | 37 |
| "HAT"   | 51 | 51 | 51 | 51 |
| "HUT"   | 27 | 27 | 27 | 27 |
BEFORE TRAINING
FIG. 8A
|         | N1 | N2 | N3 | N4 |
|---------|----|----|----|----|
| "HIT"   | 28 | 21 | 22 | 26 |
| "HEIGHT"| 19 | 34 | 20 | 27 |
| "HAT"   | 17 | 22 | 37 | 15 |
| "HUT"   | 11 | 08 | 04 | 38 |
AFTER TRAINING
FIG. 8B
FIG. 5A
FIG. 5B
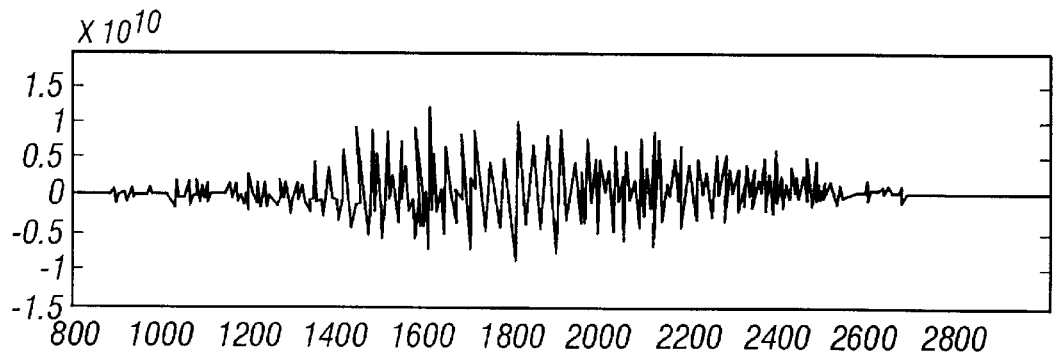
FIG. 5C

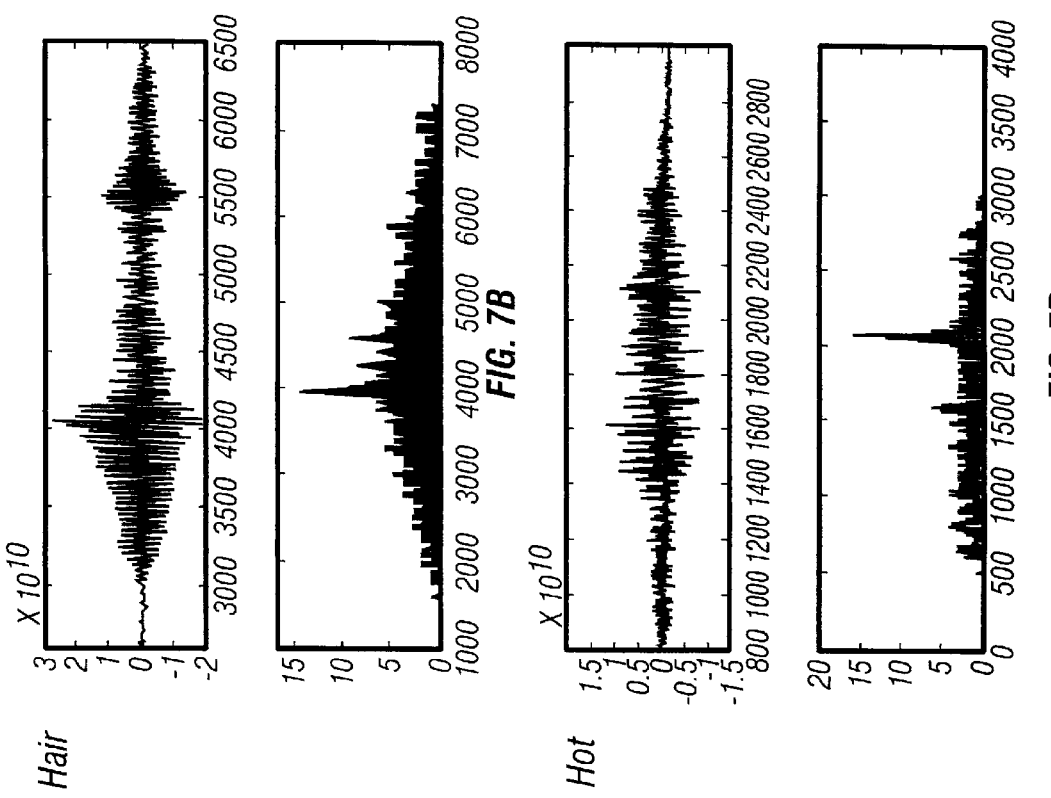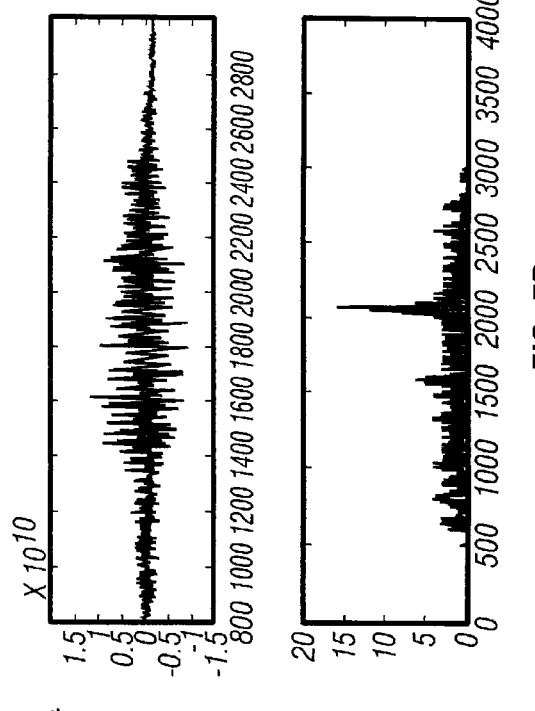
FIG. 7A  FIG. 7B
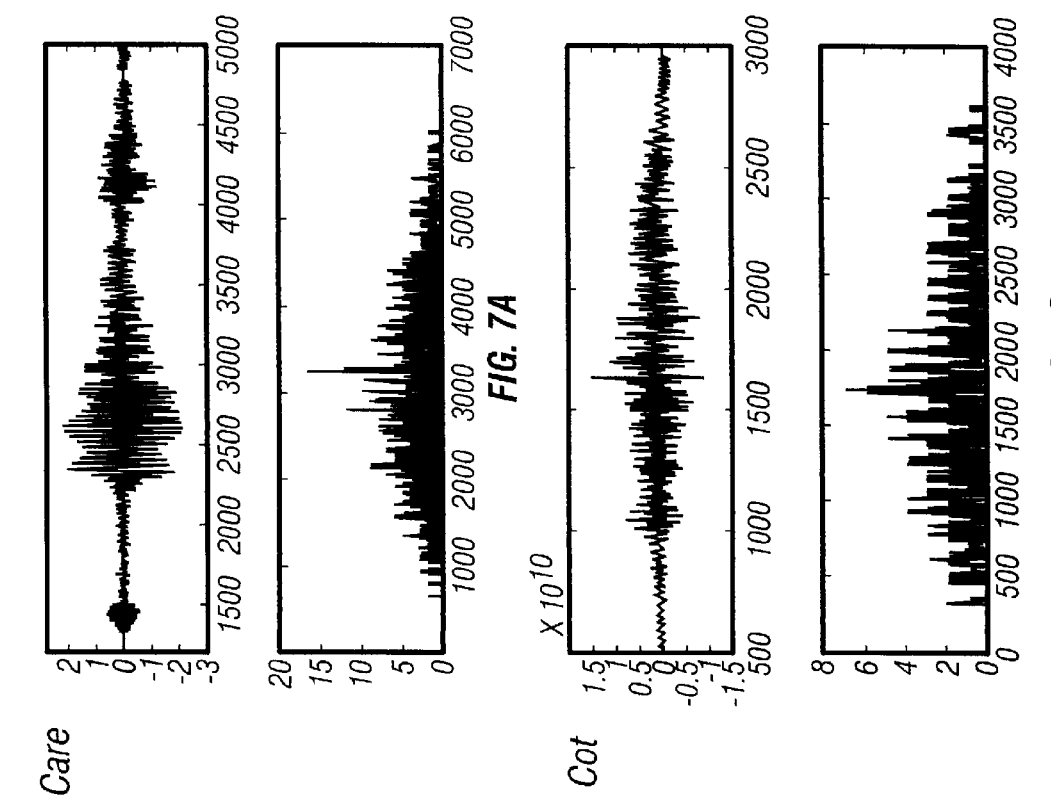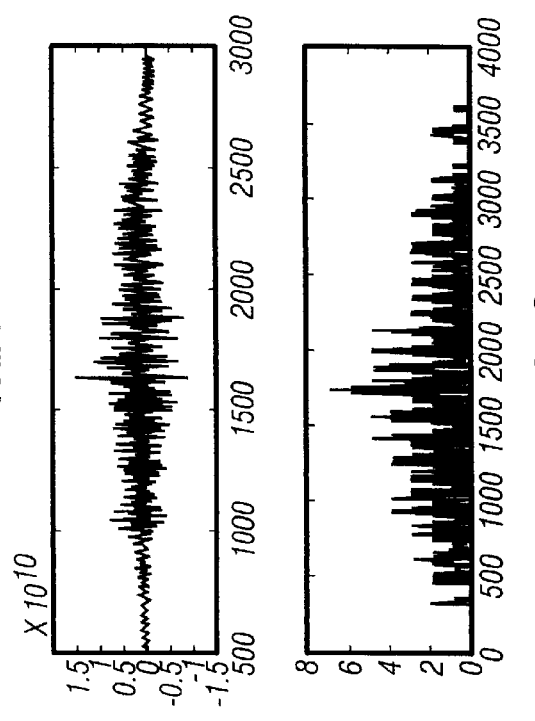
FIG. 7C  FIG. 7D

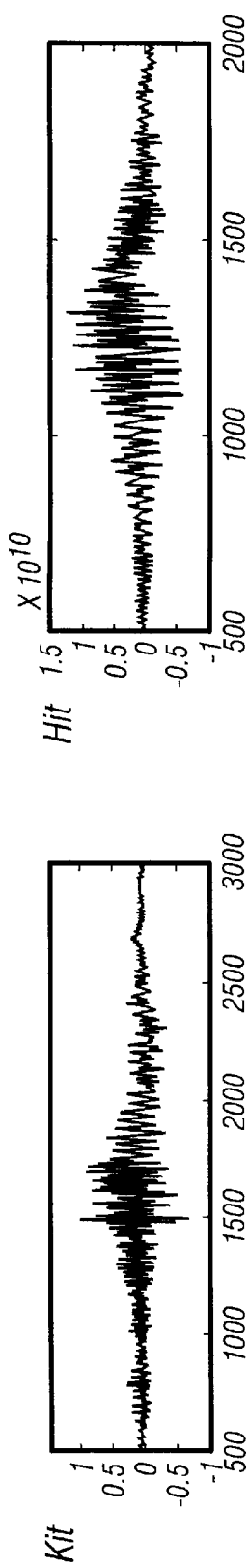
FIG. 7E
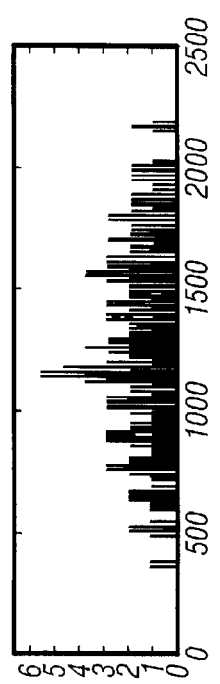
FIG. 7F
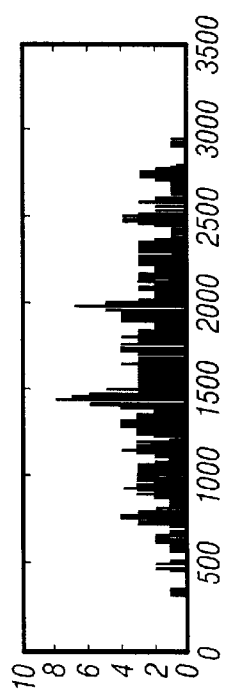
FIG. 7G
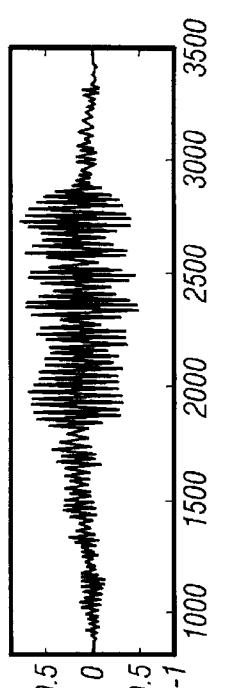
FIG. 7H
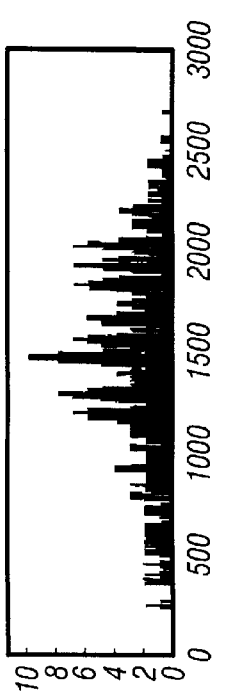

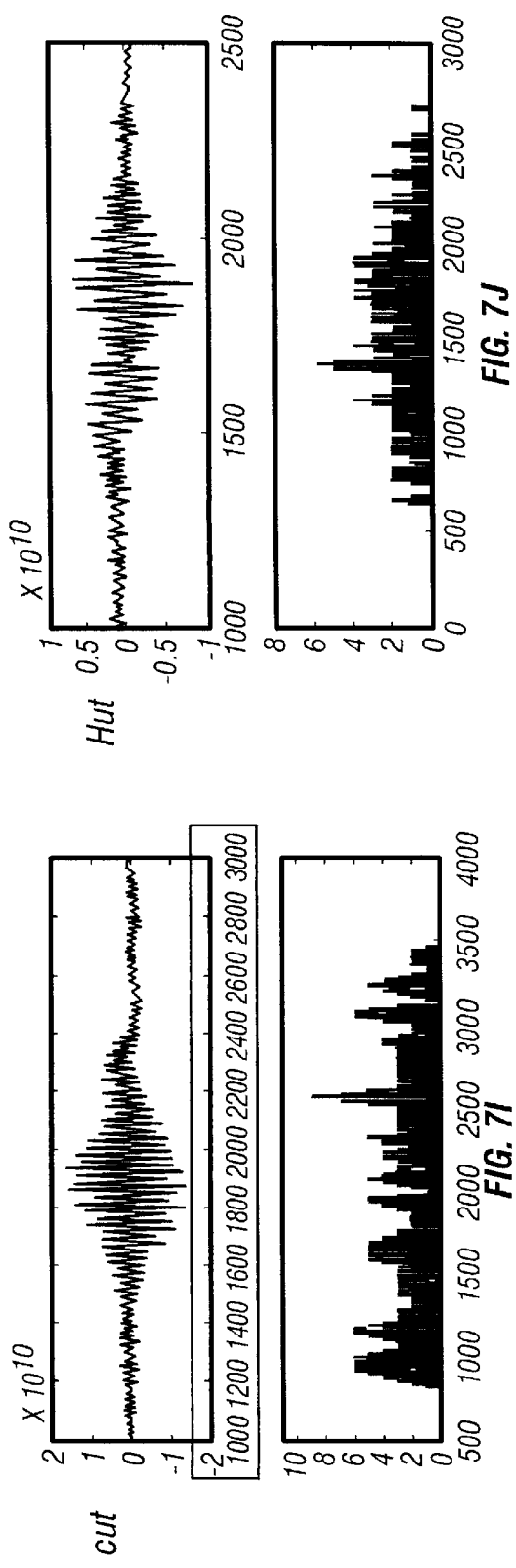
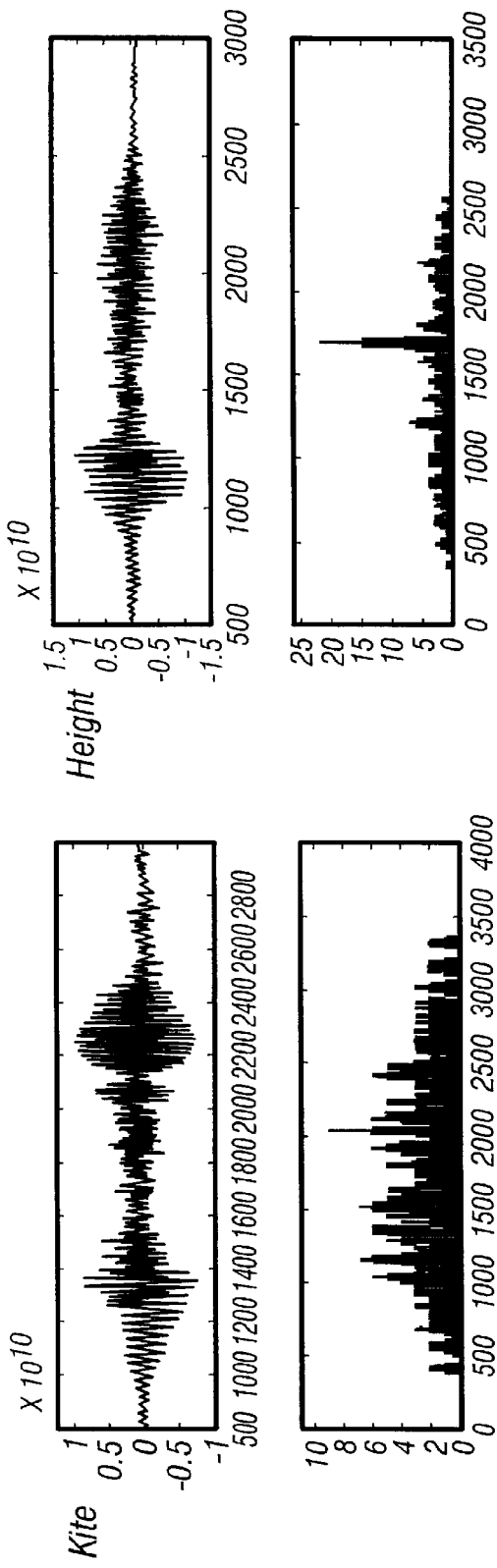
FIG. 7J
FIG. 7L
FIG. 7I
FIG. 7K

DYNAMIC SYNAPSE FOR SIGNAL PROCESSING IN NEURAL NETWORKS

This application claims the benefit of U.S. Provisional Application No. 60/049,754 filed on Jun. 11, 1997, which is incorporated herein by reference.

FIELD OF THE INVENTION

The present invention relates to information processing by signal processors connected by processing junctions, and more particularly, to neural network models that simulate and extend biological neural networks.

BACKGROUND OF THE INVENTION

A biological nervous system comprises a complex network of neurons that receive and process external stimuli to produce, exchange, and store information. A neuron, in its simplest form as a basic unit for a neural network, may be described as a cell body called soma, having one or more dendrites as input terminals for receiving signals and one or more axons as output terminals for exporting signals. The soma of a neuron processes signals received from dendrites to produce at least one action signal for transmission to other neurons via axons. Some neurons have only one axon which repeatedly splits branches, thereby allowing one neuron to communicate with multiple other neurons.

One dendrite (or axon) of a neuron and one axon (or dendrite) of another neuron are connected by a biological structure called a synapse. Hence, a neural network comprises a plurality of neurons that are interconnected by synapses. Signals are exchanged and processed within such a network.

Neurons also make anatomical and functional connections with various kinds of effector cells such as muscle, gland, or sensory cells through another type of biological junctions called neuroeffector junctions. A neuron can emit a certain neurotransmitter in response to an action signal to control a connected effector cell so that the effector cell reacts accordingly in a desired way, e.g., contraction of a muscle tissue.

The structure and operations of a biological neural network are extremely complex. Many physical, biological, and chemical processes are involved. Various simplified neural models have been developed based on certain aspects of biological nervous systems. See, Bose and Liang, "Neural network fundamentals with graphs, algorithms, and applications," McGraw-Hill (1996). A brain, for example, is a complex system and can be modeled as a neural network that processes information by the spatial and temporal pattern of neuronal activation.

One description of the operation of a general neural network is as follows. An action potential originated by a presynaptic neuron generates synaptic potentials in a postsynaptic neuron. The soma membrane of the postsynaptic neuron integrates these synaptic potentials to produce a summed potential. The soma of the postsynaptic neuron generates another action potential if the summed potential exceeds a threshold potential. This action potential then propagates through one or more axons as presynaptic potentials for other neurons that are connected. The above process forms the basis for information processing, storage, and exchange in many neural network models.

Action potentials and synaptic potentials can form certain temporal patterns or sequences as trains of spikes. The temporal intervals between potential spikes carry a significant part of the information in a neural network.

Another significant part of the information in a neural network is the spatial patterns of neuronal activation. This is determined by the spatial distribution of the neuronal activation in the network. It is desirable to stimulate both the temporal and spatial patterns in a neural network model. See, for example, Deadwyler et al., "Hippocampal ensemble activity during spatial delayed-nonmatch-to-sample performance in rats," Journal of Neuroscience, Vol. 16, pp.354–372 (1996) and Thiels et al., "Excitatory stimulation during postsynaptic inhibition induces long-term depression in hippocampus in-vivo," Journal of Neuroscience, Vol. 72, pp.3009–3016 (1994) and "NMDA receptor-dependent LTD in different subfields of hippocampus in vivo and in vitro," Hippocampus, Vol. 6, pp. 43–51 (1996).

Many neural network models are based on the following two assumptions. First, synaptic strength, i.e., the efficacy of a synapse in generating a synaptic potential, is assumed to be static during a typical time scale for generating an action potential in neurons. The efficacy of a synapse is essentially a constant during a signal train. Certain models modify this assumption by allowing a slow variation over a period of processing many signal trains. In the second assumption, each sending neuron provides the same signal to all other neurons to which it is synaptically connected.

SUMMARY OF THE INVENTION

One aspect of the present invention provides an improved neural network model that removes the above two assumptions and enables neural network devices to perform complex tasks. The present invention includes information processing systems and methods that are inspired by and are configured to extend certain aspects of a biological neural network. The functions of signal processors and processing junctions connecting the signal processors correspond to biological neurons and synapses, respectively. Each of the signal processors and processing junctions may comprise any one or a combination of an optical element, an electronic device, a biological unit, or a chemical material. The processing systems and methods may also be simulated by using one or more computer programs.

Each processing junction is configured to dynamically adjust its response strength according to the temporal pattern of an incoming signal train of spikes. Hence, such a processing junction changes its response to the incoming signal and hence simulates a "dynamic synapse".

Different processing junctions in general respond differently to the same input signal. This produces different output junction signals. This provides a specific way of transforming a temporal pattern of a signal train of spikes into a spatio-temporal pattern of junction events. In addition, the network of the signal processors and processing junctions can be trained to learn certain characteristics embedded in input signals.

One embodiment of a system for information processing includes a plurality of signal processors connected to communicate with one another and configured to produce at least one output signal in response to at least one input signal, and a plurality of processing junctions disposed to interconnect the signal processors. Each of the processing junctions receives and processes a prejunction signal from a first signal processor in the network based on at least one internal junction process to produce a junction signal which causes a postjunction signal to a second signal processor in the network. Each processing junction is configured so that the junction signal has a dynamic dependence on the prejunction signal.

At least one of the processing junctions may have another internal junction process that makes a different contribution to the junction signal than the internal junction process.

Each of the processing junctions may be connected to receive an output signal from the second signal processor and configured to adjust the internal junction process according to the output signal.

These and other aspects and advantages of the present invention will become more apparent in light of the following detailed description, the accompanying drawings, and the appended claims.

BRIEF DESCRIPTION OF THE DRAWINGS

FIGS. 5A and 5B are charts respectively showing sample waveforms of the word "hot" spoken by two different speakers.

FIG. 5C shows the waveform of the cross-correlation between the waveforms for the word "hot" in FIGS. 5A and 5B.

FIGS. 7A–7L are charts showing extraction of invariant features from other test words by using the neural network in FIG. 6A.

FIGS. 8A and 8B respectively show the output signals from four output neurons before and after training of each neuron to respond preferentially to a particular word spoken by different speakers.

DETAILED DESCRIPTION OF THE PREFERRED EMBODIMENTS

Certain aspects of the invention have been disclosed by Liaw and Berger in "Dynamic synapse: a new concept of neural representation and computation," Hippocampus, Vol. 6, pp. 591–600 (1996); "Computing with dynamic synapse: a case study of speech recognition," Proceedings of International Conference on Neural Network, Houston, Tex., June of 1997; and "Robust speech recognition with dynamic synapses," Proceedings of the International Joint Conference on Neural Network, Anchorage, Ak., May of 1998. The disclosure of the above references are incorporated herein by reference.

The following description uses terms "neuron" and "signal processor", "synapse" and "processing junction", "neural network" and "network of signal processors" in a roughly synonymous sense. Biological terms "dendrite" and "axon" are also used to respectively represent an input terminal and an output terminal of a signal processor (i.e., a "neuron").

Figure 1:
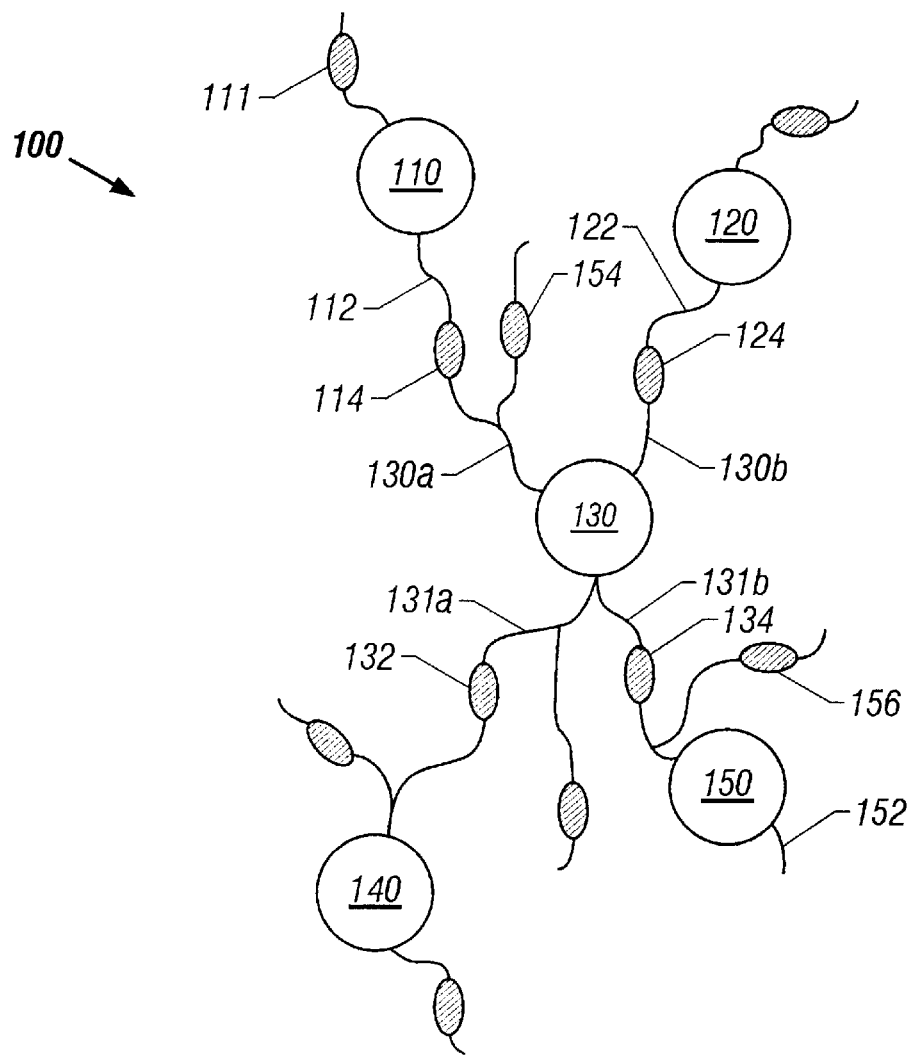
FIG. 1 is a schematic illustration of a neural network formed by neurons and dynamic synapses.

A neural network 100 based on dynamic synapses is schematically illustrated by FIG. 1. Large circles (e.g., 110, 120, etc.) represent neurons and small ovals (e.g., 114, 124, etc.) represent dynamic synapses that interconnect different neurons. Effector cells and respective neuroeffector junctions are not depicted here for sake of simplicity. The dynamic synapses each have the ability to continuously change an amount of response to a received signal according to a temporal pattern and magnitude variation of the received signal. This is different from many conventional models for neural networks in which synapses are static and each provide an essentially constant weighting factor to change the magnitude of a received signal.

Neurons 110 and 120 are connected to a neuron 130 by dynamic synapses 114 and 124 through axons 112 and 122, respectively. A signal emitted by the neuron 110, for example, is received and processed by the synapse 114 to produce a synaptic signal which causes a postsynaptic signal to the neuron via a dendrite 130a. The neuron 130 processes the received postsynaptic signals to produce an action potential and then sends the action potential downstream to other neurons such as 140, 150 via axon branches such as 131a, 131b and dynamic synapses such as 132, 134. Any two connected neurons in the network 100 may exchange information. Thus the neuron 130 may be connected to an axon 152 to receive signals from the neuron 150 via, e.g., a dynamic synapse 154.

Information is processed by neurons and dynamic synapses in the network 100 at multiple levels, including but not limited to, the synaptic level, the neuronal level, and the network level.

At the synaptic level, each dynamic synapse connected between two neurons (i.e., a presynaptic neuron and a postsynaptic neuron with respect to the synapse) also processes information based on a received signal from the presynaptic neuron, a feedback signal from the postsynaptic neuron, and one or more internal synaptic processes within the synapse. The internal synaptic processes of each synapse respond to variations in temporal pattern and/or magnitude of the presynaptic signal to produce synaptic signals with dynamically-varying temporal patterns and synaptic strengths. For example, the synaptic strength of a dynamic synapse can be continuously changed by the temporal pattern of an incoming signal train of spikes. In addition, different synapses are in general configured by variations in their internal synaptic processes to respond differently to the same presynaptic signal, thus producing different synaptic signals. This provides a specific way of transforming a temporal pattern of a signal train of spikes into a spatio-temporal pattern of synaptic events. Such a capability of pattern transformation at the synaptic level, in turn, gives rise to an exponential computational power at the neuronal level.

Another feature of the dynamic synapses is their ability for dynamic learning. Each synapse is connected to receive a feedback signal from its respective postsynaptic neuron such that the synaptic strength is dynamically adjusted in order to adapt to certain characteristics embedded in received presynaptic signals based on the output signals of the postsynaptic neuron. This produces appropriate transformation functions for different dynamic synapses so that the characteristics can be learned to perform a desired task such as recognizing a particular word spoken by different people with different accents.

Figure 2A:
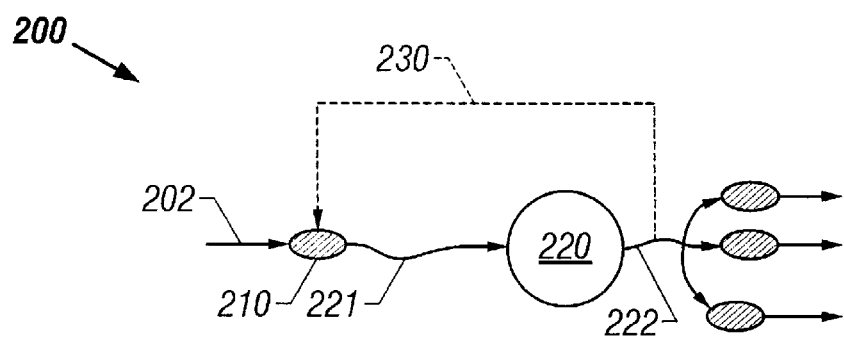
FIG. 2A is a diagram showing a feedback connection to a dynamic synapse from a postsynaptic neuron.

FIG. 2A is a diagram illustrating this dynamic learning in which a dynamic synapse 210 receives a feedback signal 230 from a postsynaptic neuron 220 to learn a feature in a presynaptic signal 202. The dynamic learning is in general implemented by using a group of neurons and dynamic synapses or the entire network 100 of FIG. 1.

Neurons in the network 100 of FIG. 1 are also configured to process signals. A neuron may be connected to receive signals from two or more dynamic synapses and/or to send an action potential to two or more dynamic synapses. Referring to FIG. 1, the neuron 130 is an example of such a neuron. The neuron 110 receives signals only from a synapse 111 and sends signals to the synapse 114. The neuron 150 receives signals from two dynamic synapses 134 and 156 and sends signals to the axon 152. However connected to other neurons, various neuron models may be used. See, for example, Chapter 2 in Bose and Liang, supra., and Anderson, "An introduction to neural networks," Chapter 2, MIT (1997).

One widely-used simulation model for neurons is the integrator model. A neuron operates in two stages. First, postsynaptic signals from the dendrites of the neuron are added together, with individual synaptic contributions combining independently and adding algebraically, to produce a resultant activity level. In the second stage, the activity level is used as an input to a nonlinear function relating activity level (cell membrane potential) to output value (average output firing rate), thus generating a final output activity. An action potential is then accordingly generated. The integrator model may be simplified as a two-state neuron as the McCulloch-Pitts "integrate-and-fire" model in which a potential representing "high" is generated when the resultant activity level is higher than a critical threshold and a potential representing "low" is generated otherwise.

A real biological synapse usually includes different types of molecules that respond differently to a presynaptic signal. The dynamics of a particular synapse, therefore, is a combination of responses from all different molecules. A dynamic synapse may be configured to simulate the contributions from all dynamic processes corresponding to responses of different types of molecules. A specific implementation of the dynamic synapse may be modeled by the following equations:

$$P_i(t) = \sum_m K_{i,m}(t) * F_{i,m}(t), \qquad (1)$$

where $P_i(t)$ is the potential for release (i.e., synaptic potential) from the ith dynamic synapse in response to a presynaptic signal, $K_{i,m}(t)$ is the magnitude of the mth dynamic process in the ith synapse, and $F_{i,m}(t)$ is the response function of the mth dynamic process.

The response $F_{i,m}(t)$ is a function of the presynaptic signal, $A_p(t)$, which is an action potential originated from a presynaptic neuron to which the dynamic synapse is connected. The magnitude of $F_{i,m}(t)$ varies continuously with the temporal pattern of $A_p(t)$. In certain applications, $A_p(t)$ may be a train of spikes and the mth process can change the response $F_{i,m}(t)$ from one spike to another. $A_p(t)$ may also be the action potential generated by some other neuron, and one such example will be given later. Furthermore, $F_{i,m}(t)$ may also have contributions from other signals such as the synaptic signal generated by dynamic synapse i itself, or contributions from synaptic signals produced by other synapses.

Since one dynamic process may be different form another, $F_{i,m}(t)$ may have different waveforms and/or response time constants for different processes and the corresponding magnitude $K_{i,m}(t)$ may also be different. For a dynamic process m with $K_{i,m}(t)>0$, the process is said to be excitatory, since it increases the potential of the postsynaptic signal. Conversely, a dynamic process m with $K_{i,m}(t)<0$ is said to be inhibitory.

In general, the behavior of a dynamic synapse is not limited to the characteristics of a biological synapse. For example, a dynamic synapse may have various internal processes. The dynamics of these internal processes may take different forms such as the speed of rise, decay or other aspects of the waveforms. A dynamic synapse may also have a response time faster than a biological synapse by using, for example, high-speed VLSI technologies. Furthermore, different dynamic synapses in a neural network or connected to a common neuron can have different numbers of internal synaptic processes.

The number of dynamic synapses associated with a neuron is determined by the network connectivity. In FIG. 1, for example, the neuron 130 as shown is connected to receive signals from three dynamic synapses 114, 154, and 124.

The release of a synaptic signal, $R_i(t)$, for the above dynamic synapse may be modeled in various forms. For example, the integrate models for neurons may be directly used or modified for the dynamic synapse. One simple model for the dynamic synapse is a two-state model similar to a neuron model proposed by McCulloch and Pitts:

$$R_i(t) = \begin{cases} 0 & \text{if } P_i(t) \le \theta_i, \\ f[P_i(t)] & \text{if } P_i(t) > \theta_i, \end{cases} \qquad (2)$$

where the value of $R_i(t)$ represents the occurrence of a synaptic event (i.e., release of neurotransmitter) when $R_i(t)$ is a non-zero value, $f[P_i(t)]$, or non-occurrence of a synaptic event when $R_i(t)=0$ of and $\theta_i$ is a threshold potential for the ith dynamic synapse. The synaptic signal $R_i(t)$ causes generation of a postsynaptic signal, $S_i(t)$, in a respective postsynaptic neuron by the dynamic synapse. For convenience, $f[P_i(t)]$ may be set to 1 so that the synaptic signal $R_i(t)$ is a binary train of spikes with 0s and 1s. This provides a means of coding information in a synaptic signal.

Figure 2B:
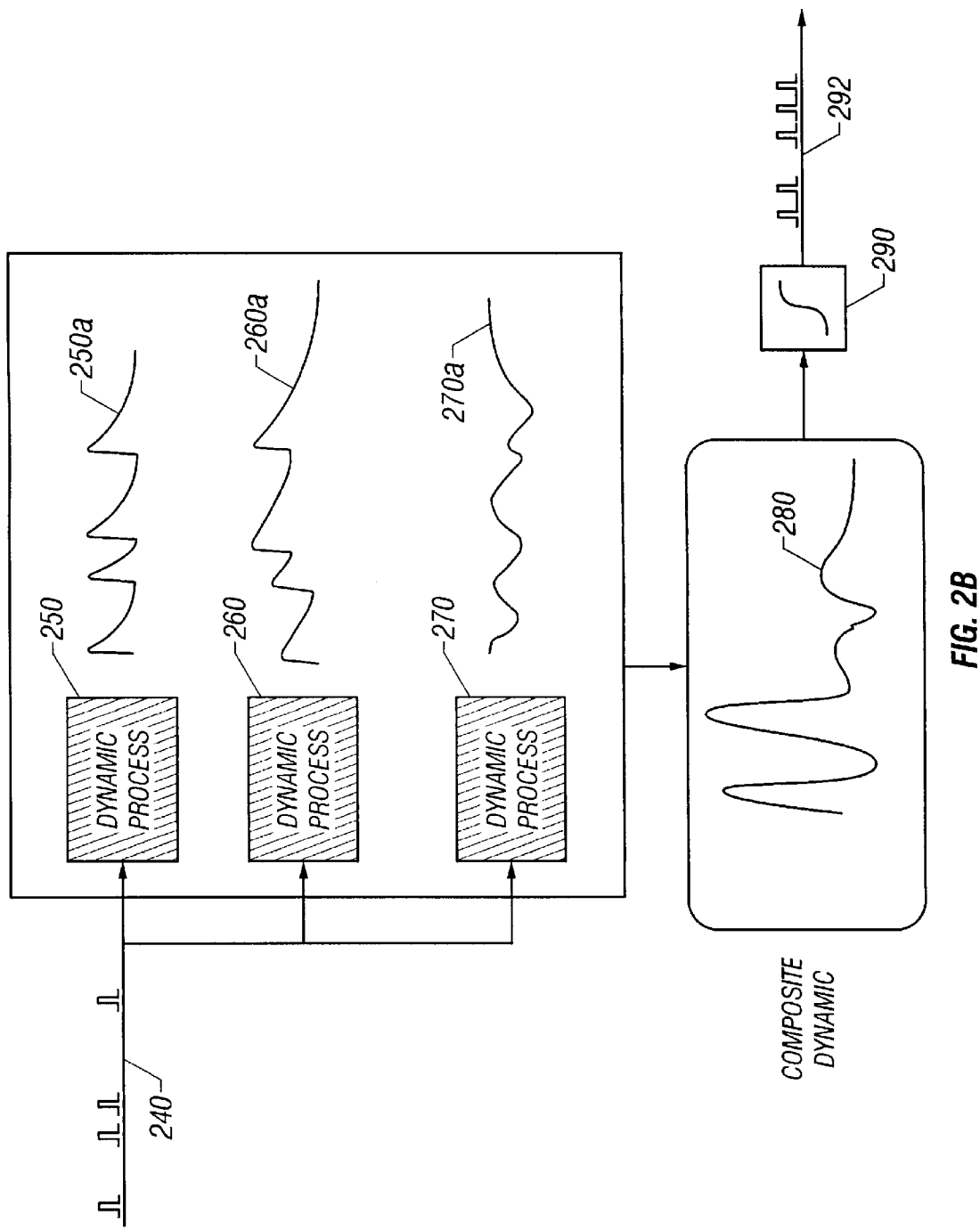
FIG. 2B is a block diagram illustrating signal processing of a dynamic synapse with multiple internal synaptic processes.

FIG. 2B is a block diagram illustrating signal processing of a dynamic synapse with multiple internal synaptic processes. The dynamic synapse receives an action potential 240 from a presynaptic neuron (not shown). Different internal synaptic processes 250, 260, and 270 are shown to have different time-varying magnitudes 250a, 260a, and 270a, respectively. The synapse combines the synaptic processes 250a, 260a, and 270a to generate a composite synaptic potential 280 which corresponds to the operation of Equation (1). A thresholding mechanism 290 of the synapse performs the operation of Equation (2) to produce a synaptic signal 292 of binary pulses.

Figure 3A:
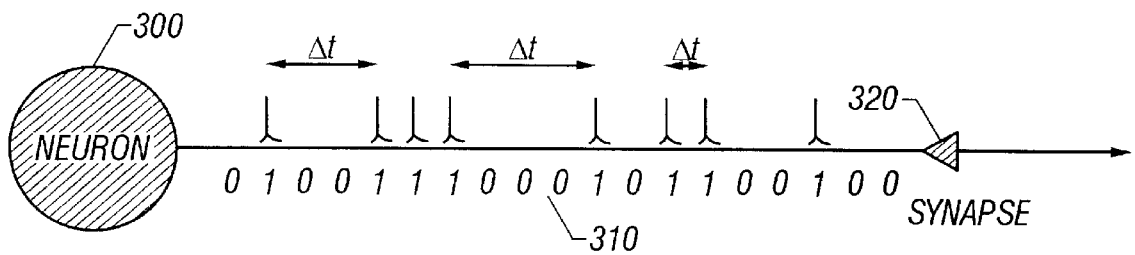
FIG. 3A is a diagram showing a temporal pattern generated by a neuron to a dynamic synapse.

The probability of release of a synaptic signal $R_i(t)$ is determined by the dynamic interaction of one or more internal synaptic processes and the temporal pattern of the spike train of the presynaptic signal. FIG. 3A shows a presynaptic neuron 300 sending out a temporal pattern 310 (i.e., a train of spikes of action potentials) to a dynamic synapse 320a. The spike intervals affect the interaction of various synaptic processes.

Figure 3B:
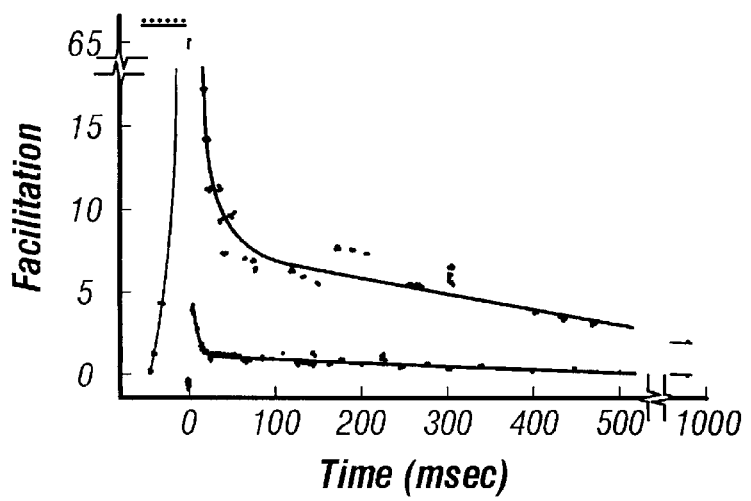
FIG. 3B is a chart showing two facilitative processes of different time scales in a synapse.
Figure 3C:
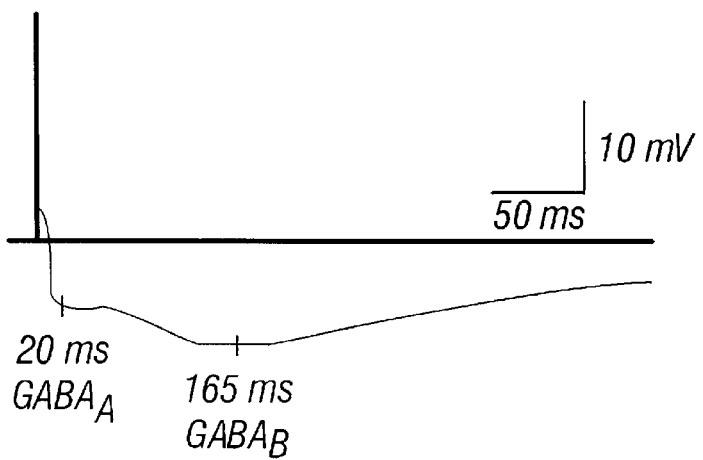
FIG. 3C is a chart showing the responses of two inhibitory dynamic processes in a synapse as a function of time.
Figure 3D:
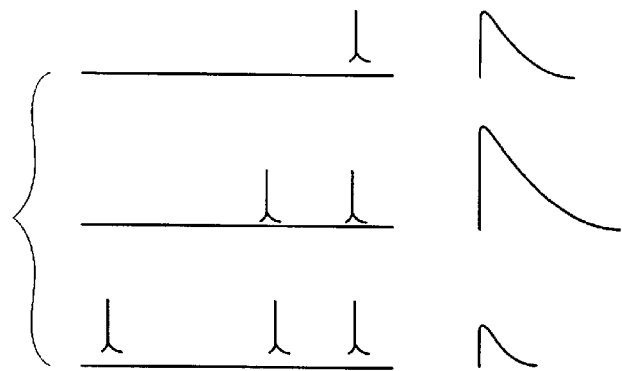
FIG. 3D is a diagram illustrating the probability of release as a function of the temporal pattern of a spike train due to the interaction of synaptic processes of different time scales.

FIG. 3B is a chart showing two facilitative processes of different time scales in a synapse. FIG. 3C shows two inhibitory dynamic processes (i.e., fast $GABA_A$ and slow $GABA_B$). FIG. 3D shows the probability of release is a function of the temporal pattern of a spike train due to the interaction of synaptic processes of different time scales.

Figure 3E:
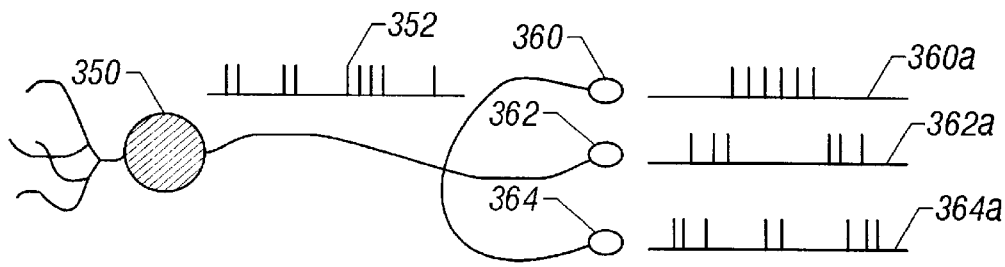
FIG. 3E is a diagram showing three dynamic synapses connected to a presynaptic neuron for transforming a temporal pattern of spike train into three different spike trains.

FIG. 3E further shows that three dynamic synapses 360, 362, 364 connected to a presynaptic neuron 350 transform a temporal spike train pattern 352 into three different spike trains 360a, 362a, and 364a to form a spatio-temporal pattern of discrete synaptic events of neurotransmitter release.

The capability of dynamically tuning synaptic strength as a function of the temporal pattern of neuronal activation gives rise to a significant representational and processing power at the synaptic level. Consider a neuron which is capable of firing at a maximum rate of 100 Hz during a time window of 100 ms. The temporal patterns that can be coded in this 10-bit spike train range from [00 . . . 0] to [11 . . . 1] to a total of $2^{10}$ patterns. Assuming that at most one release event may occur at a dynamic synapse per action potential, depending on the dynamics of the synaptic mechanisms, the number of the temporal patterns that can be coded by the release events at a dynamic synapse is $2^{10}$. For a neuron with 100 dynamic synapses, the total number of temporal patterns that can be generated is $(2^{10})^{100} = 2^{1,000}$. The number would be even higher if more than one release event is allowed per action potential. The above number represents the theoretical maximum of the coding capacity of neurons with dynamic synapses and will be reduced due to factors such as noise or low release probability.

Figure 4A:
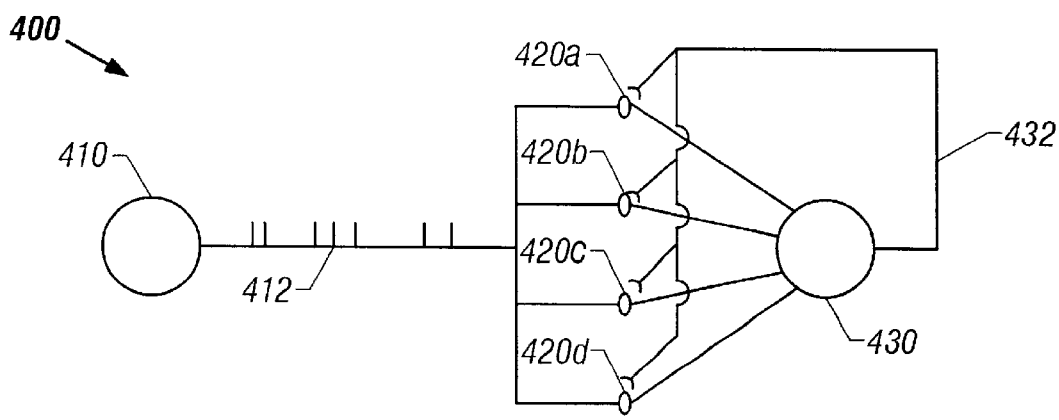
FIG. 4A is a simplified neural network having two neurons and four dynamic synapses based on the neural network of FIG. 1.

FIG. 4A shows an example of a simple neural network 400 having an excitatory neuron 410 and an inhibitory neuron 430 based on the system of FIG. 1 and the dynamic synapses of Equations (1) and (2). A total of four dynamic synapses 420a, 420b, 420c, and 420d are used to connect the neurons 410 and 430. The inhibitory neuron 430 sends a feedback modulation signal 432 to all four dynamic synapses.

The potential of release, $P_i(t)$, of ith dynamic synapse can be assumed to be a function of four processes: a rapid response, $F_0$, by the synapse to an action potential $A_p$ from the neuron 410, first and second components of facilitation $F_1$ and $F_2$ within each dynamic synapse, and the feedback modulation Mod which is assumed to be inhibitory. Parameter values for these factors, as an example, are chosen to be consistent with time constants of facilitative and inhibitory processes governing the dynamics of hippocampal synaptic transmission in a study using nonlinear analytic procedures. See, Berger et al., "Nonlinear systems analysis of network properties of the hippocampal formation", in "Neurocomputation and learning: foundations of adaptive networks," edited by Moore and Gabriel, pp.283–352, MIT Press, Cambridge (1991) and "A biologically-based model of the functional properties of the hippocampus," Neural Networks, Vol. 7, pp.1031–1064 (1994).

Figure 4B:
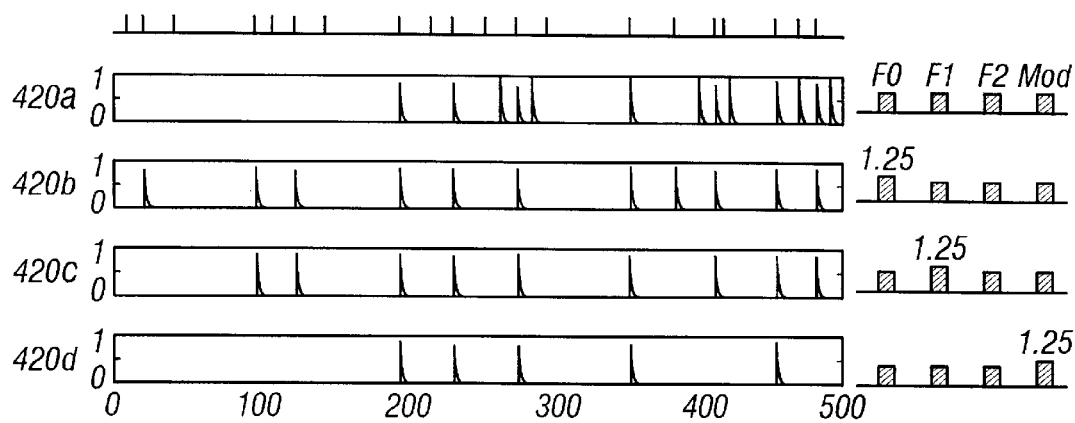
FIGS. 4B–4D show simulated output traces of the four dynamic synapses as a function of time under different responses of the synapses in a simplified network of FIG. 4A.
Figure 4C:
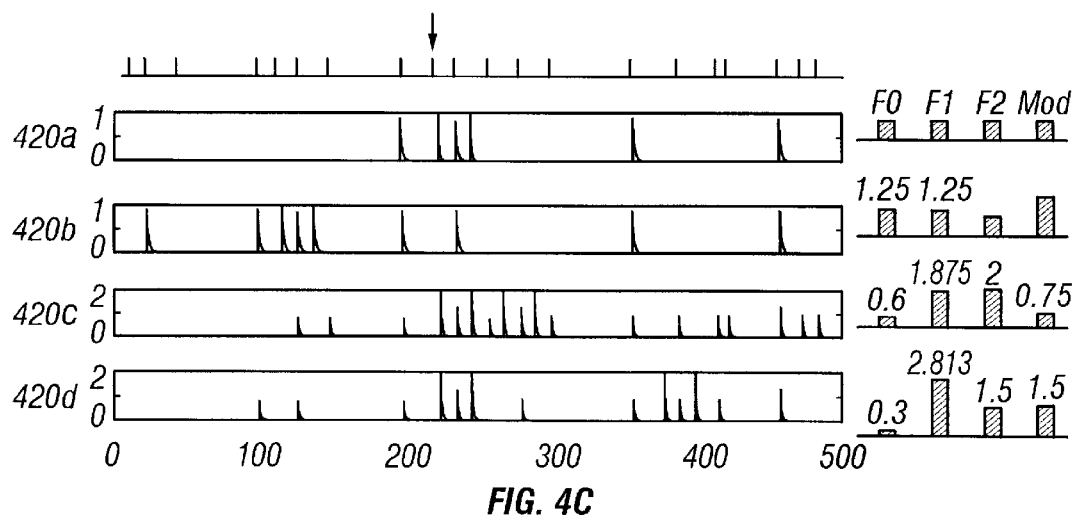
Figure 4D:
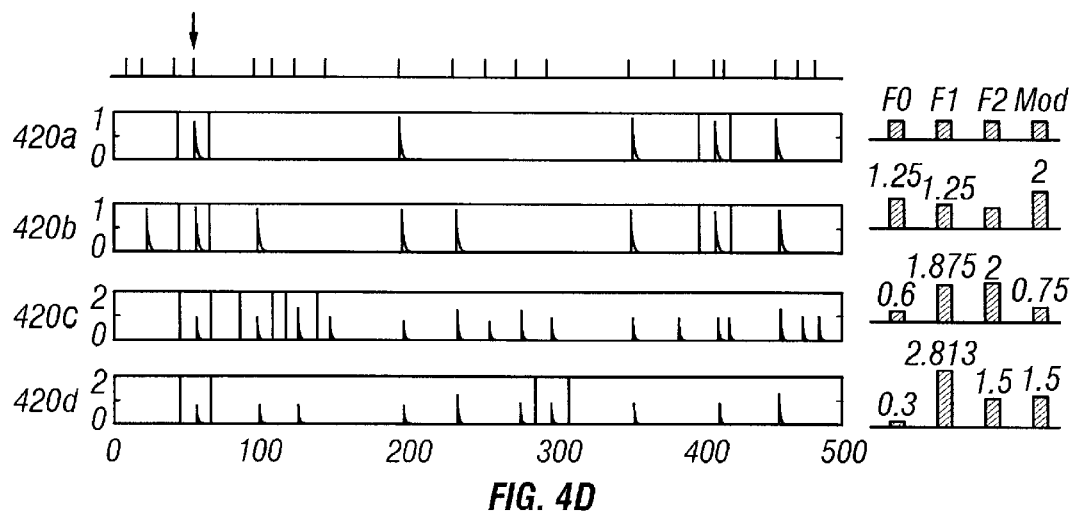

FIGS. 4B–4D show simulated output traces of the four dynamic synapses as a function of time under different responses of the synapses. In each figure, the top trace is the spike train 412 generated by the neuron 410. The bar chart on the right hand side represents the relative strength, i.e., $K_{i,m}$ in Equation (1), of the four synaptic processes for each of the dynamic synapses. The numbers above the bars indicate the relative magnitudes with respect to the magnitudes of different processes used for the dynamic synapse 420a. For example, in FIG. 4B, the number 1.25 in bar chart for the response for $F_1$ in the synapse 420c (i.e., third row, second column) means that the magnitude of the contribution of the first component of facilitation for the synapse 420c is 25% greater than that for the synapse 420a. The bars without numbers thereabove indicate that the magnitude is the same as that of the dynamic synapse 420a. The boxes that encloses release events in FIGS. 4B and 4C are used to indicate the spikes that will disappear in the next figure using different response strengths for the synapses. For example, the rightmost spike in the response of the synapse 420a in FIG. 4B will not be seen in the corresponding trace in FIG. 4C. The boxes in FIG. 4D, on the other hand, indicate spikes that do not exist in FIG. 4C.

The specific functions used for the four synaptic processes in the simulation are as follows. The rapid response, $F_0$, to the action potential, $A_p$, is expressed as $$\tau_{F_0} \frac{dF_0}{dt} = -F_0 + k_{F_0} A_{p'} \tag{3}$$

where $\tau_{F0}=0.5$ ms is the time constant of $F_0$ for all dynamic synapses and $k_{F0}=10.0$ is for the synapse 420a and is scaled proportionally based on the bar charts in FIGS. 4B–4D for other synapses.

The time dependence of $F_1$ is $$\tau_{f1} \frac{dF_1}{dt} = -F_1(t) + k_{f1} \cdot A_{p'} \tag{4}$$

where $\tau_{f1}=66.7$ ms is the decay time constant of the first component of facilitation of all dynamic synapses and $k_{f1}=0.16$ for the synapse 420a.

The time dependence of $F_2$ is $$\tau_{f2} \frac{dF_2}{dt} = -F_2(t) + k_{f2} \cdot A_{p'} \tag{5}$$

where $\tau_{f2}=300$ ms is the decay time constant of the second component of facilitation of all dynamic synapses and $K_{f2}=80.0$ for the synapse 420a.

The inhibitory feedback modulation is $$\tau_{Mod}\frac{dMod}{dt} = -Mod + k_{Mod} \cdot A_{Inh'} \quad (6)$$

where $A_{Inh}$ is the action potential generated by the neuron 430, $\tau_{Mod}=10$ ms is the decay time constant of the feedback modulation of facilitation of all dynamic synapses, and $k_{Mod}=-20.0$ is for the synapse 420a.

Equations (3)–(6) are specific examples of $F_{i,m}(t)$ in Equation (1). Accordingly, the potential of release at each synapse is a sum of all four contributions based on Equation (1):

$$P = F_0 + F_1 + F_2 + Mod. \quad (7)$$

A quanta Q (=1.0) of neurotransmitter is released if P is greater than a threshold $\theta_R$ (=1.0) and there is at least one quanta of neurotransmitter in each synapse available for release (i.e., the total amount of neurotransmitter, $N_{total}$, is greater than a quanta for release). The amount of the neurotransmitter at the synaptic cleft, $N_R$, is an example of $R_i(t)$ in Equation (2). Upon release of a quanta of neurotransmitter, $N_R$ is reduced exponentially with time from the initial amount of Q:

$$N_R = Q\exp\left[-\frac{t}{\tau_0}\right], \quad (8)$$

where $\tau_0$ is a time constant and is taken as 1.0 ms for simulation. After the release, the total amount of neurotransmitter is reduced by Q.

There is a continuous process for replenishing neurotransmitter within each synapse. This process can be simulated as follows:

$$\frac{dN_{Total}}{dt} = \tau_{rp}(N_{max} - N_{Total}), \quad (9)$$

where $N_{max}$ is the maximum amount of available neurotransmitter and $\tau_{rp}$ is the rate of replenishing neurotransmitter, which are 3.2 and 0.3 ms$^{-1}$ in the simulation, respectively.

The synaptic signal, $N_R$, causes generation of a postsynaptic signal, S, in a respective postsynaptic neuron. The rate of change in the amplitude of the postsynaptic signal S in response to an event of neurotransmitter release is proportional to $N_R$:

$$\tau_S\frac{dS}{dt} = -S + k_S \cdot N_{R'} \quad (10)$$

where $\tau_S$ is the time constant of the postsynaptic signal and taken as 0.5 ms for simulation and $k_S$ is a constant which is 0.5 for simulation. In general, a postsynaptic signal can be either excitatory ($k_S>0$) or inhibitory ($k_S<0$).

The two neurons 410 and 430 are modeled as "integrate-and-fire" units having a membrane potential, V, which is the sum of all synaptic potentials, and an action potential, $A_p$ from a presynaptic neuron:

$$\tau_V\frac{dV}{dt} = -V + \sum_i S_i, \quad (11)$$

where $\tau_V$ is the time constant of V and is taken as 1.5 ms for simulation. The sum is taken over all internal synapse processes.

In the simulation, $A_p=1$ if $V>\theta_R$ which is 0.1 for the presynaptic neuron 410 and 0.02 for the postsynaptic neuron 430. It also assumed that the neuron is not in the refractory period ($T_{ref}=2.0$ ms), i.e., the neuron has not fired within the last $T_{ref}$ of 2 ms.

Referring back to FIGS. 4B–4D, the parameter values for the synapse 420a is kept as constant in all simulations and is treated as a base for comparison with other dynamic synapses. In the first simulation of FIG. 4B, only one parameter is varied per terminal by an amount indicated by the respective bar chart. For example, the contribution of the current action potential ($F_0$) to the potential of release is increased by 25% for the synapse 420b, whereas the other three parameters remain the same as the synapse 420a. The results are as expected, namely, that an increase in either $F_0$, $F_1$, or $F_2$ leads to more release events, whereas increasing the magnitude of feedback inhibition reduces the number of release events.

The transformation function becomes more sophisticated when more than one synaptic mechanism undergoes changes as shown in FIG. 4C. First, although the parameters remain constant in the synapse 420a, fewer release events occur since an overall increase in the output from the other three synapses 420b, 420c, 420d causes an increased activation of the postsynaptic neuron. This in turn exerts greater inhibition of the dynamic synapses. This exemplifies how synaptic dynamics can be influenced by network dynamics. Second, the differences in the outputs from dynamic synapses are not merely in the number of release events, but also in their temporal patterns. For example, the second dynamic synapse (420b) responds more vigorously to the first half of the spike train and less to the second half, whereas the third terminal (420c) responds more to the second half. In other words, the transform of the spike train by these two dynamic synapses are qualitatively different.

Next, the response of dynamic synapses to different temporal patterns of action potentials is also investigated. This aspect has been tested by moving the ninth action potential in the spike train to a point about 20 ms following the third action potential (marked by arrows in FIGS. 4C and 4D). As shown in FIG. 4D, the output patterns of all dynamic synapses are different from the previous ones. There are some changes that are common to all terminals, yet some are specific to certain terminals only. Furthermore, due to the interaction of dynamics at the synaptic and network levels, removal of an action potential (the ninth in FIG. 4C) leads to a decrease of release events immediately, and an increase in release events at a later time.

The above discussion of the computational power of a neural system with dynamic synapses is considered purely based on theoretical grounds, and the actual computational capacity of a given neural system certainly would be limited by certain practical biological constraints. For example, the representational capability of $2^{1,000}$ is based on the assumption that a dynamic synapse is sensitive to the occurrence or nonoccurrence of a single action potential (i.e., each "bit") in a spike train. In many practical situations, noise may corrupt an input spike train and thus can adversely affect the response of a neural network. It is important to determine whether dynamic synapses are capable of extracting statistically significant features from noisy spike trains. This problem is particularly acute in biology given that, to survive, an animal must extract regularities from an otherwise constantly changing environment. For instance, a rat must be able to choose from a number of possible routes to navigate to its nest or to a food store. These possible routes includes some novel routes and one or more certain given routes regardless of variations in a wide variety of conditions such as lighting, time of day, a cloud drifting by, a swaying tree, winds, odors, sounds, etc. Thus, neurons in the hippocampus must extract invariants from varying input signals.

One aspect of the invention is a dynamic learning ability of a neural network based on dynamic synapses. Referring back to the system 100 in FIG. 1, each dynamic synapse is configured according to a dynamic learning algorithm to modify the coefficient, i.e., $K_{i,m}(t)$ in Equation (1), of each synaptic process in order to find an appropriate transformation function for a synapse by correlating the synaptic dynamics with the activity of the respective postsynaptic neurons. This allows each dynamic synapse to learn and to extract certain feature from the input signal that contribute to the recognition of a class of patterns.

In addition, the system 100 of FIG. 1 creates a set of features for identifying a class of signals during a learning and extracting process with one specific feature set for each individual class of signals.

One embodiment of the dynamic learning algorithm for mth process of ith dynamic synapse can be expressed as the following equation:

$$K_{i,m}(t+\Delta t)=K_{i,m}(t)+\alpha_m \cdot F_{i,m}(t) \cdot A_{pj}(t) - \beta_m \cdot [F_{i,m}(t) - F^0_{i,m}], \quad (12)$$

where $\Delta t$ is the time elapse during a learning feedback, $\alpha_m$ is a learning rate for the mth process, and $A_{pj}$ (=1 or 0) indicates the occurrence ($A_{pj}=1$) or non-occurrence ($A_{pj}=0$) of an action potential of postsynaptic neuron j that is connected to the ith dynamic synapse, $\beta_m$ is a decay constant for the mth process and $F^0_{i,m}$ is a constant for mth process of ith dynamic synapse. Equation (12) provides a feedback from a postsynaptic neuron to the dynamic synapse and allows a synapse to respond according to a correlation therebetween. This feedback is illustrated by a dashed line 230 directed from the postsynaptic neuron 220 to the dynamic synapse 210 in FIG. 2.

The above learning algorithm enhances a response by a dynamic synapse to patterns that occur persistently by varying the synaptic dynamics according to the correlation of the activation level of synaptic mechanisms and postsynaptic neuron. For a given noisy input signal, only the subpatterns that occur consistently during a learning is process can survive and be detected by synaptic synapses.

This provides a highly dynamic picture of information processing in the neural network. At any state in a chain of information processing, the dynamic synapses of a neuron extract a multitude of statistically significant temporal features from an input spike train and distribute these temporal features to a set of postsynaptic neurons where the temporal features are combined to generate a set of spike trains for further processing. From the perspective of pattern recognition, each dynamic synapse learns to create a "feature set" for representing a particular component of the input signal. Since no assumptions are made regarding feature characteristics, each feature set is created on-line in a class-specific manner, i.e., each class of input signals is described by its own, optimal set of features.

This dynamic learning algorithm is broadly and generally applicable to pattern recognition of spatio-temporal signals. The criteria for modifying synaptic dynamics may vary according to the objectives of a particular signal processing task. In speech recognition, for example, it may be desirable to increase a correlation between the output patterns of the neural network between varying waveforms of the same word spoken by different speakers in a learning procedure. This reduces the variability of the speech signals. Thus, during presentation of the same words, the magnitude of excitatory synaptic processes is increased and the magnitude of inhibitory synaptic processes is decreased. Conversely, during presentation of different words, the magnitude of excitatory synaptic processes is decreased and the magnitude of inhibitory synaptic processes is increased.

A speech waveform as an example for temporal patterns has been used to examine how well a neural network with dynamic synapses can extract invariants. Two well-known characteristics of a speech waveform are noise and variability. Sample waveforms of the word "hot" spoken by two different speakers are shown in FIGS. 5A and 5B, respectively. FIG. 5C shows the waveform of the cross-correlation between the waveforms in FIGS. 5A and 5B. The correlation indicates a high degree of variations in the waveforms of the word "hot" by the two speakers. The task includes extracting invariant features embedded in the waveforms that give rise to constant perception of the word "hot" and several other words of a standard "HVD" test (H-vowel-D, e.g., had, heard, hid). The test words are care, hair, key, heat, kit, hit, kite, height, cot, hot, cut, hut, spoken by two speakers in a typical research office with no special control of the surrounding noises (i.e., nothing beyond lowering the volume of a radio). The speech of the speakers is first recorded and digitized and then fed into a computer which is programmed to simulate a neural network with dynamic synapses.

The aim of the test is to recognize words spoken by multiple speakers by a neural network model with dynamic synapses. In order to test the coding capacity of dynamic synapses, two constraints are used in the simulation. First, the neural network is assumed to be small and simple. Second, no preprocessing of the speech waveforms is allowed.

Figure 6A:
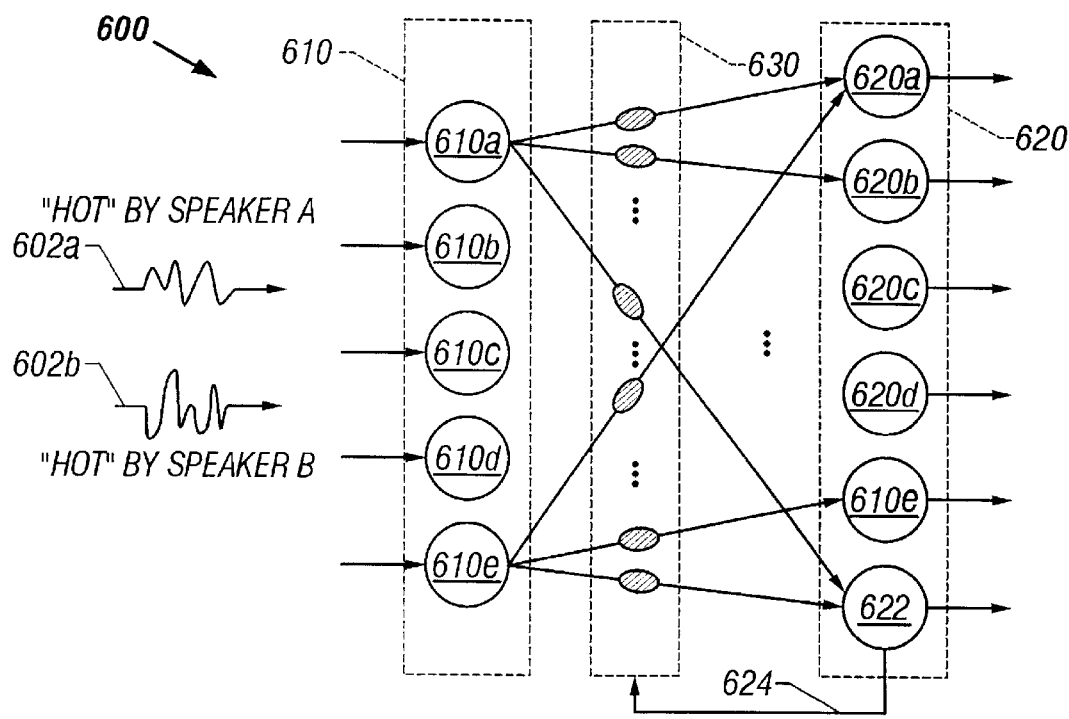
FIG. 6A is schematic showing a neural network model with two layers of neurons for simulation.

FIG. 6A is schematic showing a neural network model 600 with two layers of neurons for simulation. A first layer of neurons, 610, has 5 input neurons 610a, 610b, 610c, 610d, and 610e for receiving unprocessed noisy speech waveforms 602a and 602b from two different speakers. A second layer 620 of neurons 620a, 620b, 620c, 620d, 620e and 622 forms an output layer for producing output signals based on the input signals. Each input neuron in the first layer 610 is connected by 6 dynamic synapses to all of the neurons in the second layer 620 so there are a total of 30 dynamic synapses 630. The neuron 622 in the second layer 620 is an inhibitory interneuron and is connected to produce an inhibitory signal to each dynamic synapse as indicated by a feedback line 624. This inhibitory signal serves as the term "$A_{inh}$" in Equation (6). Each of the dynamic synapses 630 is also connected to receive a feedback from the output of a respective output neuron in the second layer 620 (not shown).

The dynamic synapses and neurons are simulated as previously described and the dynamic learning algorithm of Equation (12) is applied to each dynamic synapse. The speech waveforms are sampled at 8 KHz. The digitized amplitudes are fed to all the input neurons and are treated as excitatory postsynaptic potentials.

The network 600 is trained to increase the cross-correlation of the output patterns for the same words while reducing that for different words. During learning, the presentation of the speech waveforms is grouped into blocks in which the waveforms of the same word spoken by different speakers are presented to the network 600 for a total of four times. The network 600 is trained according to the following Hebbian and anti-Hebbian rules. Within a presentation block, the Hebbian rule is applied: if a postsynaptic neuron in the second layer 620 fires after the arrival of an action potential, the contribution of excitatory synaptic mechanisms is increased, while that of inhibitory mechanisms is decreased. If the postsynaptic neuron does not fire, then the excitatory mechanisms are decreased while the inhibitory mechanisms are increased. The magnitude of change is the product of a predefined learning rate and the current activation level of a particular synaptic mechanism. In this way, the responses to the temporal features that are common in the waveforms will be enhanced while that to the idiosyncratic features will be discouraged. When the presentation first switches to the next block of waveforms of a new word, the anti-Hebbian rule is applied by changing the sign of the learning rates $\alpha_m$ and $\beta_m$ in Equation (12). This enhances the differences between the response to the current word and the response to the previous different word.

Figure 6B:
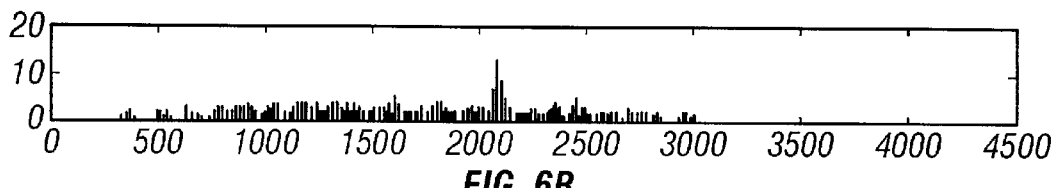
FIGS. 6B, 6C, 6D, 6E, and 6F are charts respectively showing the cross-correlation functions of the output signals from the output neurons for the word "hot" in the neural network of FIG. 6A after training.
Figure 6C:
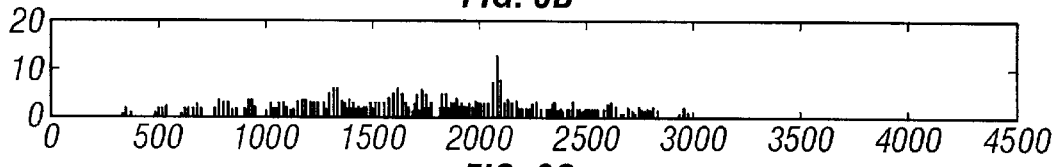
Figure 6D:
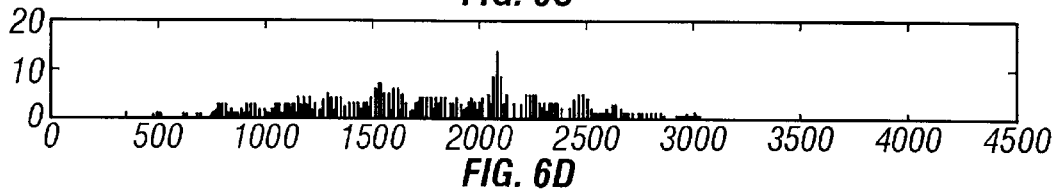
Figure 6E:
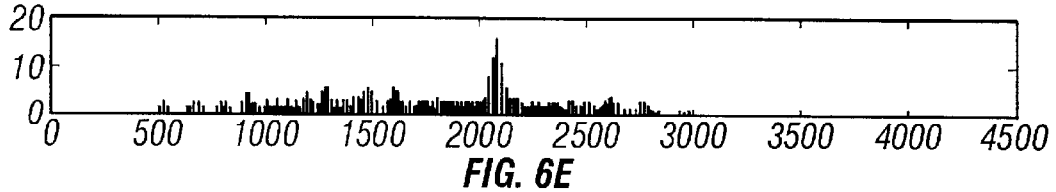
Figure 6F:
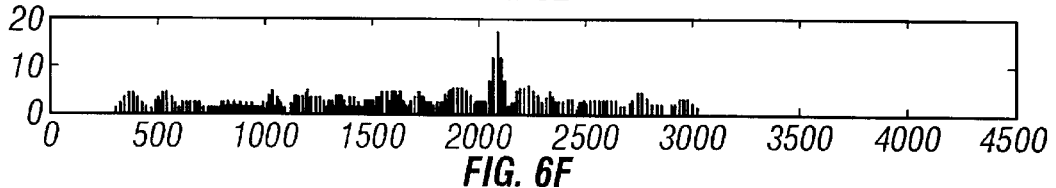

The results of training the neural network 600 are shown in FIGS. 6B, 6C, 6D, 6E, and 6F, which respectively correspond to the cross-correlation functions of the output signals from neurons 620a, 620b, 620c, 620d, and 620e for the word "hot". For example, FIG. 6B shows the cross-correlation of the two output patterns by the neuron 620a in response to two waveforms of "hot" spoken by two different speakers. Compared to the correlation of the raw waveforms of the word "hot" in FIG. 5C which shows almost no correlation at all, each of the output neurons 620a–620e generates temporal patterns that are highly correlated for different input waveforms representing the same word spoken by different speakers. That is, given two radically different waveforms that nonetheless comprises a representation of the same word, the network 600 generates temporal patterns that are substantially identical.

The extraction of invariant features from other test words by using the neural network 600 are shown in FIGS. 7A–7L. A significant increase in the cross-correlation of output patterns is obtained in all test cases.

The above training of a neural network by using the dynamic learning algorithm of Equation (12) can further enable a trained network to distinguish waveforms of different words. As an example, the neural network 600 of FIG. 6A produces poorly correlated output signals for different words after training.

A neural network based on dynamic synapses can also be trained in certain desired ways. A "supervised" learning, for example, may be implemented by training different neurons in a network to respond only to different features. Referring back to the simple network 600 of FIG. 6A, the output signals from neurons 602a ("N1"), 602b ("N2"), 602c ("N3"), and 602d ("N4") may be assigned to different "target" words, for example, "hit", "height", "hot", and "hut", respectively. During learning, the Hebbian rule is applied to those dynamic synapses of 630 whose target words are present in the input signals whereas the anti-Hebbian rule is applied to all other dynamic synapses of 630 whose target words are absent in the input signals.

FIGS. 8A and 8B show the output signals from the neurons 602a ("N1"), 602b ("N2"), 602c ("N3"), and 602d ("N4") before and after training of each neuron to respond preferentially to a particular word spoken by different speakers. Prior to training, the neurons respond identically to the same word. For example, a total of 20 spikes are produced by every one of the neurons in response to the word "hit" and 37 spikes in response to the word "height", etc. as shown in FIG. 8A. After training the neurons 602a, 602b, 602c, and 602d to preferably respond to words "hit", "height", "hat", and "hut", respectively, each trained neuron learns to fire more spikes for its target word than other words. This is shown by the diagonal entries in FIG. 8B. For example, the second neuron 602b is trained to respond to word "height" and produces 34 spikes in presence of word "height" while producing less than 30 spikes for other words.

Figure 9A:
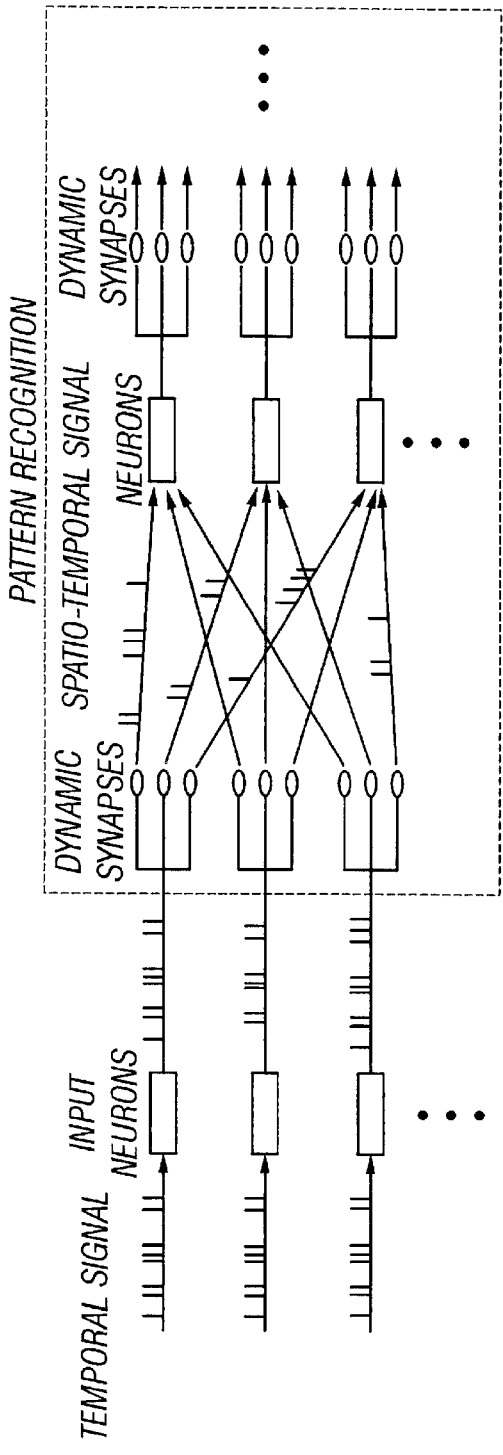
FIG. 9A is a diagram showing one implementation of temporal signal processing using a neural network based on dynamic synapses.

The above simulations of speech recognition are examples of temporal pattern recognition in the more general temporal signal processing where the input can be either continuous such as a speech waveform, or discrete such as time series data. FIG. 9A shows one implementation of temporal signal processing using a neural network based on dynamic synapses. All input neurons receive the same temporal signal. In response, each input neuron generates a sequence of action potentials (i.e., a spike train) which has a similar temporal characteristics to the input signal. For a given presynaptic spike train, the dynamic synapses generate an array of spatio-temporal patterns due to the variations in the synaptic dynamics across the dynamic synapses of a neuron. The temporal pattern recognition is achieved based on the internally-generated spatio-temporal signals.

Figure 9B:
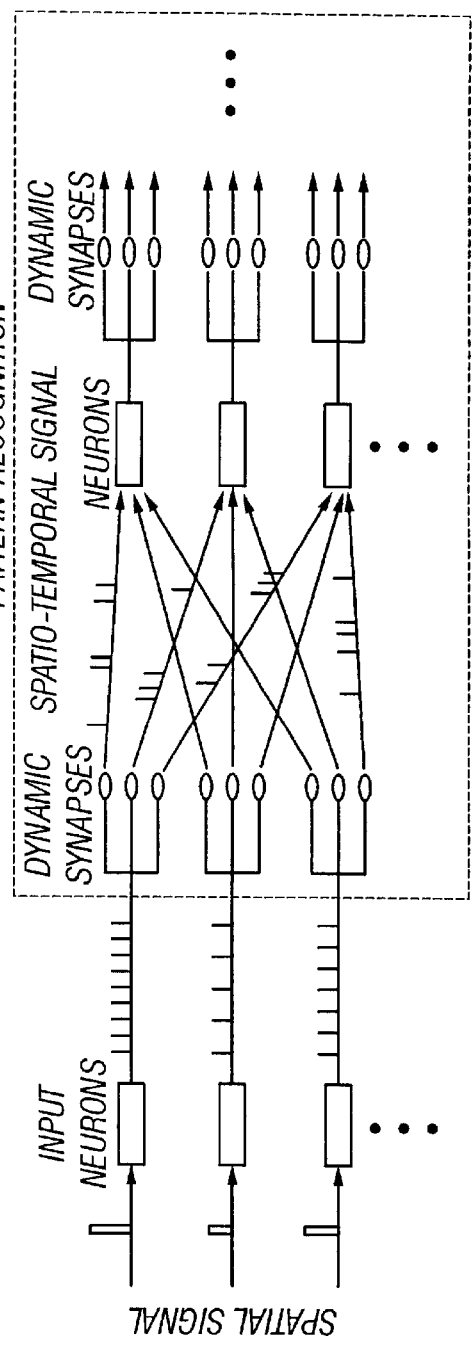
FIG. 9B is a diagram showing one implementation of spatial signal processing using a neural network based on dynamic synapses.

A neural network based on dynamic synapses can also be configured to process spatial signals. FIG. 9B shows one implementation of spatial signal processing using a neural network based on dynamic synapses. Different input neurons at different locations in general receive input signals of different magnitudes. Each input neuron generates a sequence of action potentials with a frequency proportional the to the magnitude of a respective received input signal. A dynamic synapse connected to an input neuron produces a distinct temporal signal determined by particular dynamic processes embodied in the synapse in response to a presynaptic spike train. Hence, the combination of the dynamic synapses of the input neurons provide a spatio-temporal signal for subsequent pattern recognition procedures.

It is further contemplated that the techniques and configurations in FIGS. 9A and 9B can be combined to perform pattern recognition in one or more input signals having features with both spatial and temporal variations.

The above described neural network models based on dynamic synapses can be implemented by devices having electronic components, optical components, and biochemical components. These components may produce dynamic processes different from the synaptic and neuronal processes in biological nervous systems. For example, a dynamic synapse or a neuron may be implemented by using RC circuits. This is indicated by Equations (3)–(11) which define typical responses of RC circuits. The time constants of such RC circuits may be set at values that different from the typical time constants in biological nervous systems. In addition, electronic sensors, optical sensors, and biochemical sensors may be used individually or in combination to receive and process temporal and/or spatial input stimuli.

Figure 10:
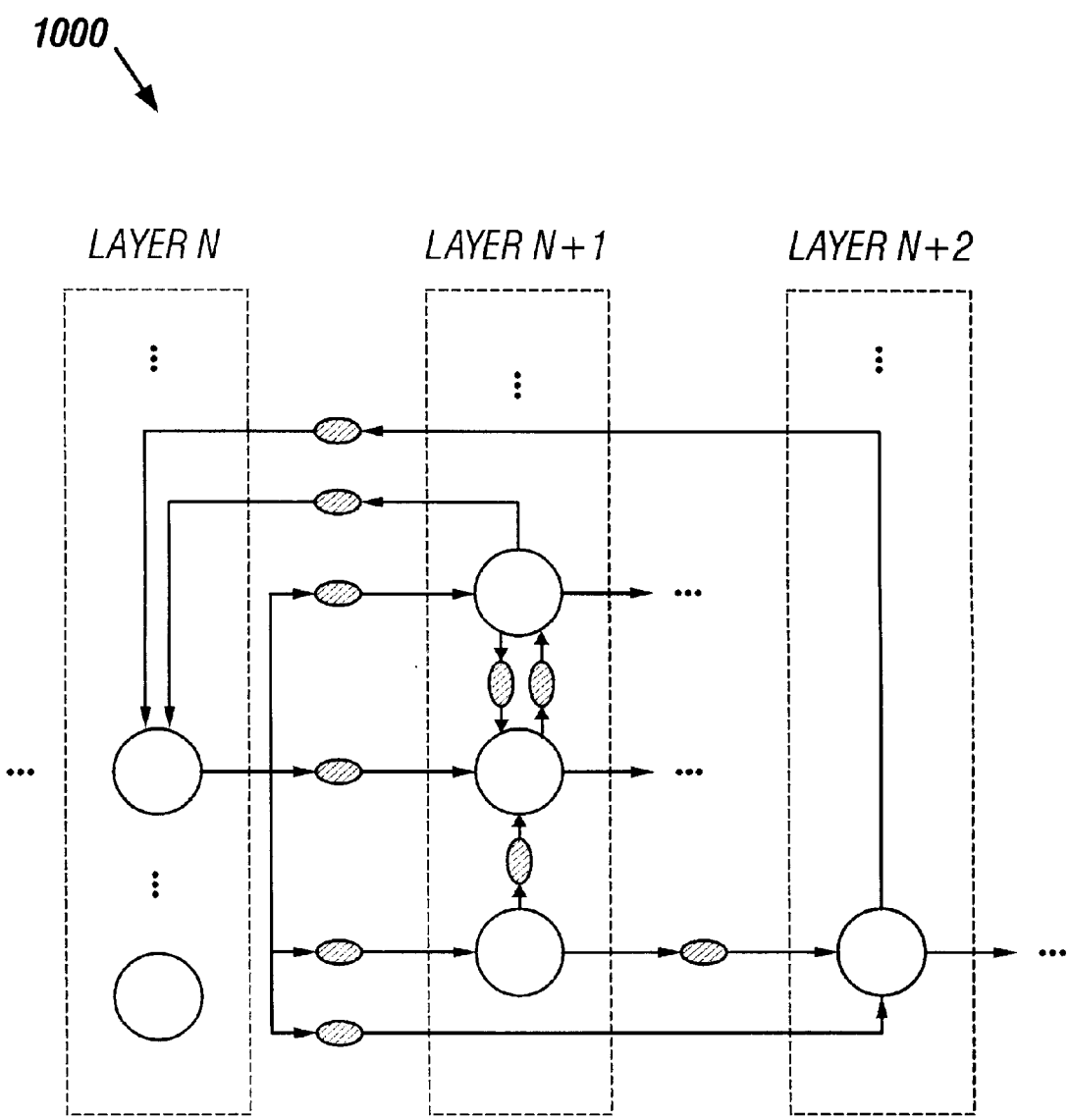
FIG. 10 is a diagram showing one implementation of a neural network based on dynamic synapses for processing spatio-temporal information.

Although the present invention has been described in detail with reference to the preferred embodiments, various modifications and enhancements may be made without departing from the spirit and scope of the invention. For example, Equations (3)–(11) used in the examples have responses of RC circuits. Other types of responses may also be used such as a response in form of the $\alpha$ function: $G(t)=\alpha^2 t e^{-\alpha t}$, where $\alpha$ is a constant and may be different for different synaptic processes. For another example, various different connecting configurations other than the examples shown in FIGS. 9A and 9B may be used for processing spatio-temporal information. FIG. 10 shows another embodiment of a neural network based on dynamic synapses. In yet another example, the two-state model for the output signal of a dynamic synapse in Equation (2) may be modified to produce spikes of different magnitudes depending on the values of the potential for release. These and other variations are intended to be encompassed by the following claims.

What is claimed is:

1. A system for information processing, comprising:
   a plurality of signal processing elements connected to communicate with one another and configured to respond to a received input signal; and
   a plurality of processing junctions disposed to interconnect said plurality of signal processing elements to form a network, wherein each of said processing junctions receives and processes a prejunction signal from a first signal processing element in said network based on at least one internal junction process to produce a junction signal that constantly varies with at least one parameter of said prejunction signal, wherein, upon receiving one impulse action potential in the prejunction signal, each processing junction is operable to respond in one of three manners: (1) producing one single corresponding impulse; (2) producing no corresponding impulse; and (3) producing two or more corresponding impulses.

2. A system as in claim 1, wherein at least one of an amplitude and a temporal frequency of said junction signal varies with said at least one parameter of said prejunction signal.

3. A system as in claim 1, wherein said at least one parameter of said prejunction signal includes at least a magnitude or a frequency of said prejunction signal.

4. A system as in claim 1, wherein at least two of said plurality of processing junctions that are connected to receive signals from a common signal processing element in said network produce different junction signals.

5. A system as in claim 1, wherein at least one of said plurality of processing junctions has another internal junction process that makes a different contribution to said junction signal than said at least one internal junction process.

6. A system as in claim 1, wherein each of said plurality of processing junctions is connected to receive an output signal from said second signal processing element and configured to adjust said at least one internal junction process according to said output signal.

7. A system as in claim 6, wherein said network of said plurality of signal processing elements and said plurality of processing junctions is operable to respond to a specified feature from said at least one input signal.

8. A system as in claim 6, wherein said network of said plurality of signal processing elements and said plurality of processing junctions is configured in a way that a first signal processing element is operable to produce a first output signal to indicate a first feature in said at least one input signal and a second signal processing element is operable to produce a second output signal to indicate a second feature in said at least one input signal.

9. A system as in claim 1, wherein said network of said plurality of signal processing elements and said plurality of processing junctions is configured to indicate a spatial feature in said at least one output signal that is embedded in said at least one input signal.

10. A system as in claim 1, wherein said network of said plurality of signal processing elements and said plurality of processing junctions is configured to indicate a temporal feature in said at least one output signal that is embedded in said at least one input signal.

11. A system for information processing, comprising a signal processor and a processing junction connected to communicate with each other to process an input signal received by said processing junction, wherein said processing junction has at least one internal junction process which responds to said input signal to produce a junction signal and said signal processor is operable to produce an output signal in response to said junction signal, wherein said processing junction is operable to respond in one of three manners to each impulse action potential in said input signal: (1) producing one single corresponding impulse; (2) producing no corresponding impulses; and (3) producing two or more corresponding impulses.

12. A system as in claim 11, wherein said processing junction is operable to adjust said junction signal according to a magnitude variation in said input signal.

13. A system as in claim 11, wherein said processing junction is operable to adjust said junction signal according to a temporal variation in said input signal.

14. A system as in claim 11, wherein said processing junction is configured to have another internal junction process that responds to said input signal to produce another junction signal that also has a dependence on said characteristics of said input signal, said processing junction operating to combine said junction signal and said another junction signal to generate a total junction signal.

15. A system as in claim 11, wherein said processing junction is configured to release said junction signal only when a magnitude of said junction signal is greater than a predetermined junction threshold.

16. A system as in claim 11, wherein said processing junction is operable to make said junction signal to be either excitatory or inhibitory to said signal processor.

17. A system as in claim 11, wherein said signal processor is configured to release said output signal only when a magnitude of said junction signal is greater than a predetermined processor threshold.

18. A system as in claim 11, further comprising a feedback loop disposed to connect said processing junction to said signal processor so that at least a portion of said output signal is fed back to said processing junction, wherein said processing junction is operable to adjust said junction signal according to said output signal.

19. A system as in claim 18, wherein said processing junction is operable to extract a specified feature from said input signal.

20. A system as in claim 19, wherein said processing junction is configured to increase a parameter of said junction signal when said specified feature is present in said input signal and to decrease said parameter of said junction signal when said specified feature is absent from said input signal.

21. A system as in claim 11, wherein at least one of said signal processor and said processing junction includes at least one element selected from an electronic device, an optical device, a biological element, or a chemical material.

22. A system for information processing, comprising:
   a first layer of N neuron-like input devices each to independently receive and process at least two different input signals;
   a second layer of M+1 neuron-like devices with M output devices and one inhibitory device, each to independently receive N intermediate signals that are generated according to output signals from said input devices, respectively, wherein each of said output devices processes respective N intermediate signals to produce an output signal indicative of information about said at least two different input signals and said inhibitory device processes respective N intermediate signals to produce a feedback signal;

a layer of N groups of independent processing junction units, each group having (M+1) processing junction units to receive an output from a designated input device to produce (M+1) intermediate signals to be respectively received by said second layer of (M+1) neuron-like devices, wherein each of said processing junction units, upon receiving one impulse action potential in an output signal from one of said input devices, is operable to respond differently from another processing junction unit receiving said output signal and to respond in one of three manners: (1) producing one single corresponding impulse, (2) producing no corresponding impulse, and (3) producing two or more corresponding impulses; and a feedback mechanism to feed said feedback signal to each of said processing junction units to control each of said intermediate signals.

23. The system as in claim 22, wherein said first and said second layers have an equal number of neuron-like processing devices (M=N).

24. A system for information processing, comprising:

a plurality of first neuron-like processing devices to respectively receive and process input signals to produce a plurality of first signals;

a plurality of processing junction units equally divided into a plurality of junction groups equal to a number of said first processing devices, each junction group having two or more processing junction units to receive one first signal from a designated first processing device to respectively produce two or more junction output signals, wherein each processing junction unit, upon receiving one impulse action potential, is operable to respond differently from another processing junction unit receiving said impulse action potential and to respond in one of three manners: (1) producing one single corresponding impulse, (2) producing no corresponding impulse, and (3) producing two or more corresponding impulses; and a plurality of second neuron-like processing devices to respectively produce a plurality of second signals, each second processing device coupled to one processing junction unit in each and every junction group to respectively receive and process respective junction output signals to produce one of said second signals.

25. The system as in claim 1, further comprising a plurality of second processing junction units equally divided into a plurality of second junction groups equal to a number of said second processing devices, each second junction group having two or more second processing junction units to receive one second signal from a designated second processing device to respectively produce two or more second junction output signals.

26. A method for processing information, comprising:

receiving a first input signal from a first neuron in an artificial neural network; and controlling a first artificial synapse which processes the first input signal to produce a first synaptic output signal so that, in response to an impulse action potential in the first input signal, the artificial synapse is operable to produce (1) one single corresponding impulse, (2) no corresponding impulse, or (3) two or more corresponding impulses.

27. The method as in claim 26, further comprising using a second artificial synapse in the neural network to receive the first input signal to produce a second synaptic output signal that is different from the first synaptic output signal.

28. The method as in claim 26, wherein the neural network includes a plurality of neurons and synapses interconnected to one another, further comprising:

sending one or more training signals having information about a feature into the neural network to allow the neural network to recognize and retain a memory of the feature; and sending another signal into the neural network to determine whether the another signal includes the feature.

29. The method as in claim 28, wherein the feature includes a temporal pattern.

30. The method as in claim 29, wherein the feature includes a speech pattern.

* * * * *

UNITED STATES PATENT AND TRADEMARK OFFICE
CERTIFICATE OF CORRECTION

PATENT NO. : 6,363,369 B1
DATED : March 26, 2002
INVENTOR(S) : Jim-Shih Liaw and Theodore W. Berger It is certified that error appears in the above-identified patent and that said Letters Patent is hereby corrected as shown below:

Column 1,
Line 7, immediately prior to "FIELD OF THE INVENTION", please insert:

-- STATEMENT AS TO FEDERALLY SPONSORED RESEARCH
This invention was made with government support under Contract No. ONR N 00014-940568 awarded by the Office of Naval Research. The government has certain rights in the invention. --

Signed and Sealed this

Sixth Day of July, 2004

JON W. DUDAS
*Acting Director of the United States Patent and Trademark Office*